United States Patent
Strutt et al.

(10) Patent No.: US 10,104,501 B2
(45) Date of Patent: Oct. 16, 2018

(54) PROXIMITY DETECTION

(71) Applicant: Elliptic Laboratories AS, Oslo (NO)

(72) Inventors: Guenael Thomas Strutt, San Francisco, CA (US); Caitlin De Leys Brandman, Santa Barbara, CA (US); Steven Paul Lewis, Cupertino, CA (US); Erik Forsström, Oslo (NO); Rachel-Mikel Arcejaeger, Mokelumne Hill, CA (US)

(73) Assignee: ELLIPTIC LABORATORIES AS, Oslo (NO)

( * ) Notice: Subject to any disclaimer, the term of this patent is extended or adjusted under 35 U.S.C. 154(b) by 0 days.

(21) Appl. No.: 15/484,936

(22) Filed: Apr. 11, 2017

(65) Prior Publication Data

US 2017/0295466 A1  Oct. 12, 2017

Related U.S. Application Data

(60) Provisional application No. 62/321,460, filed on Apr. 12, 2016.

(51) Int. Cl.
| | |
|---|---|
| *H04W 24/00* | (2009.01) |
| *H04W 4/02* | (2018.01) |
| *H04W 68/00* | (2009.01) |
| *H04M 3/42* | (2006.01) |
| *H04W 4/60* | (2018.01) |
| *H04W 4/70* | (2018.01) |
| *H04W 12/06* | (2009.01) |
| *H04M 11/00* | (2006.01) |

(52) U.S. Cl.
CPC ....... *H04W 4/023* (2013.01); *H04M 3/42178* (2013.01); *H04W 4/60* (2018.02); *H04W 4/70* (2018.02); *H04W 68/005* (2013.01); *H04M 11/007* (2013.01); *H04W 12/06* (2013.01)

(58) Field of Classification Search
CPC ..... H04W 4/023; H04W 4/003; H04W 4/005; H04W 68/005; H04W 12/06; H04M 3/42178; H04M 11/007
See application file for complete search history.

(56) References Cited

U.S. PATENT DOCUMENTS

| | | | | |
|---|---|---|---|---|
| 2009/0265470 A1* | 10/2009 | Shen | ..................... | G06F 1/1694 709/227 |
| 2010/0156660 A1* | 6/2010 | Lee | ......................... | G01S 13/82 340/8.1 |
| 2011/0162048 A1* | 6/2011 | Bilbrey | ................. | H04W 8/005 726/4 |
| 2012/0054493 A1* | 3/2012 | Bradley | ................ | H04W 8/005 713/171 |
| 2013/0337849 A1* | 12/2013 | Wan | ....................... | G01S 5/0072 455/456.6 |
| 2014/0140530 A1* | 5/2014 | Gomes-Casseres | ......................... | H04W 4/001 381/77 |

(Continued)

Primary Examiner — William Nealon
(74) Attorney, Agent, or Firm — Beyer Law Group LLP

(57) ABSTRACT

A method alerts a user of a first device to the presence of a second device which can interact with the first device. The method includes using an ultrasonic signal transmitted by one of the devices to determine whether the first device is within a threshold distance of the second device. If the first device is determined to be within the threshold distance of the second device, a notification is triggered on the first device.

29 Claims, 12 Drawing Sheets

(56) References Cited

U.S. PATENT DOCUMENTS

2014/0160880 A1\* 6/2014 King ..................... H04B 11/00
                                                    367/2
2016/0259419 A1\* 9/2016 Chatterjee ............... G06F 3/017
2017/0195936 A1\* 7/2017 Want ..................... H04W 36/32

\* cited by examiner

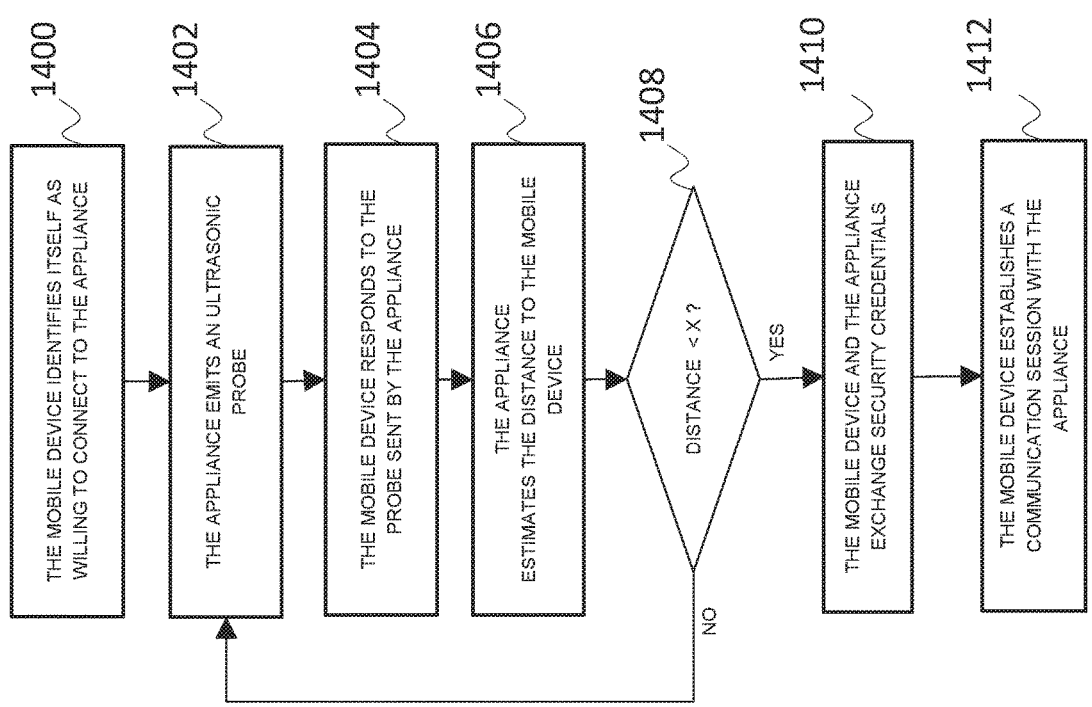

PROXIMITY DETECTION

The present invention relates to interactions between two or more electronic devices.

Modern electronic devices are becoming increasingly connected with one another using various communication methods such as ZigBee®; Bluetooth®; Bluetooth® Smart; Wi-Fi®, WiMAX™ etc. Recently, more and more devices are being equipped with the ability to communicate with one another and with the Internet in order to form the "Internet of Things" (IoT). The IoT is a term used to encompass a network of electronic devices, physical objects, buildings, vehicles, infrastructure etc. that are provided with sensors, communication interfaces and other electronic circuitry alongside appropriate software which allows them to collect, exchange and act on data. This allows devices such as refrigerators or thermostats that have conventionally been "standalone" devices to communicate with, for example, smartphones or tablets as well as remote servers. This then allows these devices to exchange data—by way of example a user may be able to control the central heating in their house from the sofa simply by interacting with an application or "app" running on their portable electronic device.

However, the Applicant has recognised that as IoT-capable devices become increasingly prevalent, there will be an ever-increasing number of devices in a typical home or other space, all of which may be made by different manufacturers requiring different apps. Even though these devices will likely be connected to the same local area network (e.g., a wireless local area network using Wi-Fi®), the Applicant has foreseen a potential issue arising whereby, for example, a user's smartphone may have so many different apps corresponding to many different IoT devices, that it could become cumbersome to remember the correct manufacturer and locate and open the correct app for the IoT device a user wishes to interact with.

When viewed from a first aspect, the present invention provides a method of alerting a user of a first device to presence of a second device which can interact with the first device, the method comprising:

using an ultrasonic signal transmitted by one of the devices to determine whether the first device is within a threshold distance of said second device;

if said first device is determined to be within said threshold distance of said second device, triggering a notification on the first device.

Thus it will be appreciated that in accordance with the present invention there is provided a method for generating a notification on one of the devices based on ultrasonic signals transmitted either by itself or by the other device. Analysis of these ultrasonic signals can be performed in order to determine that the two devices are indeed proximate to one another and thus that the notification should be triggered.

Using ultrasound to establish physical proximity to a device is a simple but powerful way of addressing the problems outlined above (with others) of having many devices on one network by using the basic principle that a user is most likely to be interested in devices closest to them.

Notifications are typically handled by the operating system e.g., iOS®, Android™ or Windows Phone® running on portable electronic devices such as smartphones, tablets and wearables. These notifications are typically a message that is displayed on a screen (e.g., as a banner across the screen or an alert in the centre of the screen) of the device and may be accompanied by an audio alert to notify a user of the device that the event has taken place.

While some of these trigger events are created locally (e.g., time-based reminders), other trigger events typically come to the device via one of its interfaces. These interfaces include: the radio modem e.g., when receiving a text message; the Bluetooth® radio e.g., when coming within range of a Bluetooth® appliance such as a hands free kit in an automotive vehicle; the Wi-Fi® radio e.g., when joining a home network; and the global positioning system (GPS) radio e.g., when entering a particular geographic area sometimes referred to as "geofencing". However, the Applicant has appreciated that using ultrasound to determine the proximity of two devices is particularly advantageous as it is superior to e.g., Bluetooth® and Wi-Fi® for determining short range proximities. Indeed, as ultrasound typically does not penetrate walls, such a method can readily determine that the devices are e.g., in the same room.

In some embodiments, the notification comprises an operating system-level notification. This is sometimes referred to as an "application" or "app" notification. This will typically appear on a user's screen regardless of what other task the user is carrying out, or it may appear on a lock screen whilst the device is not in use.

In a set of embodiments the notification provides a shortcut to an associated application installed on the first device such that interacting with the notification, e.g., by tapping the notification using a touchscreen of the first device, leads to the application opening automatically. This means that the user can quickly navigate to whichever application should be opened in order to interact with the second device, thus removing the need for the user to search through a potentially large number of applications to find the correct one. In some such embodiments, the application is a control application arranged to control the second device.

By way of non-limiting example only, the method of the present invention facilitates the generation of a notification that appears on a user's smartphone when it is deemed to be sufficiently close to his or her television. Tapping on this notification may then cause the device to open the appropriate application on the smartphone such that it can interact with the television—e.g., to change channels or volume.

It will of course be appreciated that in other embodiments the notification does not necessarily have to open an application; it may simply inform the user which application they should open should they wish to interact with the other device or simply inform them that the first and second devices are sufficiently close together that interaction may now be desired.

However, the Applicant has appreciated that the application may not necessarily be installed on the first device and thus in some embodiments, the notification provides a link to the user of the first device to download the application.

In a set of embodiments, the method further comprises:

the second device transmitting an ultrasonic signal;

the second device receiving a reflected ultrasonic signal which is a reflection of the transmitted ultrasonic signal; and the second device determining from the reflected ultrasonic signal whether the first device is within said threshold distance; and the second device sending a message to the first device to trigger said notification if the first device is determined to be within said threshold distance.

In this set of embodiments, the second device (i.e., not the device on which the notification is triggered) transmits the ultrasonic signal and some time later receives a reflection of that same signal. The second device can then analyse the reflection and determine whether or not the first device is nearby, e.g., by measuring the combined time of flight of the transmitted signal and its reflection. The second device could be arranged to use a processing algorithm which discriminates between different reflectors but this is not essential and in general the ultrasonic signal could be reflected by anything having a suitably reflective surface which the signal encounters. This could be e.g., the first device itself or a user of the first device. The Applicant has appreciated that whilst this is a relatively basic arrangement which could be triggered by any object appearing at close range to the second device, it does have some advantages as set out below. Moreover, even if 'false positives' were to occur from time to time, there are no particularly adverse implications—a user will simply receive an unwanted notification.

First is that the simplicity makes development and implementation relatively low cost. In particular it requires implementation only by the second device. This is particularly advantageous in the typical situation where the second device is physically larger than the first (which is typically a portable device such as a smartphone) and mains powered as it is easier to add components and functionality to such larger devices than it is smartphones and there is also less need to consider battery life which is of critical importance in mobile devices.

Furthermore, as the second device performs the proximity determination, the security of the second device is improved as it is more difficult for an attacker to spoof their proximity to the second device when this is based on a physical phenomenon such as propagation of ultrasound signals. This is particularly advantageous in embodiments wherein the notification allows the first device to take control of the second device.

Alternatively, in a second set of embodiments of the first aspect of the invention the method further comprises:

the first device transmitting an ultrasonic probe signal;

the second device transmitting a ultrasonic response signal; and the first device receiving the ultrasonic response signal and determining therefrom whether the first device is within said threshold distance.

In this set of embodiments, it is the first device (i.e., the device on which the notification may be triggered) that initiates the proximity detection process and is "assisted" by the second device, i.e., such embodiments utilise a "probe-and-response" based approach rather than relying on reflections of a transmitted signal. This advantageously allows for the second device to be relatively simple, since it only need respond to a probe rather than make any determination of proximity itself. This facilitates retrofitting existing products e.g., with a small ultrasound module that is arranged to receive ultrasonic probe signals and respond accordingly. On the other hand it may not be necessary to perform any hardware modification on the first device if it already has suitable ultrasound transceivers, either as dedicated transceivers or by the installed audio microphone and loudspeakers having suitable capability. Preferably the ultrasonic response signal have different properties e.g., they may use different frequency bands or orthogonal encoding. By making the two types of signal distinct from one another, the risk of a physical reflection of the probe signal being misinterpreted as a response signal is reduced.

This set of embodiments is also beneficial in avoiding the 'false positives' referred to above as it requires a particular response to be transmitted. Security for the second device is provided by the fact that 'probe' signal required for its response to be transmitted is an ultrasonic one, which again is not easy to spoof without being in physical proximity thereto.

In a third set of embodiments of the first aspect of the invention, the method further comprises:

the second device transmitting an ultrasonic probe signal;

the first device transmitting a ultrasonic response signal;

the second device receiving the ultrasonic response signal and determining therefrom whether the first device is within said threshold distance; and the second device sending a message to the first device to trigger said notification if the first device is determined to be within said threshold distance.

In this set of embodiments, as with the first set, it is the second device that initiates the proximity detection process but in this case is assisted by the first device—i.e., it is a probe-and-response based approach but the roles are reversed when compared to the second set of embodiments. This arrangement provides the security benefits associated with having the second device initiate the proximity detection process but without requiring detailed analysis of a reflected signal to determine whether or not it arises from the first device as the ultrasonic response signal may be arranged to contain data regarding the identity of the first device, or indeed it may be known that only the first device would respond with a particular ultrasonic response signal. It will further be appreciated that in comparison to the first set of embodiments, and in common with the second set of embodiments, the risk of 'false positives' is significantly reduced.

While determining that the devices are proximate may be enough to trigger the notification, in some embodiments the method further comprises determining whether the user of the first device has performed a predetermined gesture before triggering the notification. This advantageously reduces the likelihood of spurious detections and allows a user of the first device to confirm positively that that they do indeed wish to make a determination that the first and second devices are proximate to one another in order to facilitate, permit or initiate an interaction therebetween. For example, if the first device is a smartphone and the second device is an appliance, the user may physically perform a gesture with the smartphone in the presence of the appliance in order to confirm that they do indeed wish to interact with the appliance.

In some such embodiments, the second device sends said message only if it determines from the reflected ultrasonic signal that the predetermined gesture has been performed. That is to say, in embodiments wherein the second device uses reflections of a signal that it transmitted itself, the reflected signal may have certain properties that are indicative of the reflector moving in a particular way e.g., in a predetermined gesture such as moving the first device towards and then away from the second device. Ultrasound can be used to determine whether a gesture has taken place by using, by way of non-limiting example only, shifts in the frequency or phase of the reflected signal compared to the transmitted signal, e.g., by utilising the Doppler effect.

Additionally or alternatively, in some embodiments the first device triggers said notification only if it determines that the predetermined gesture has been performed. For example, the first device may comprise a motion sensor such as an accelerometer and/or a gyroscope which it uses to determine whether the predetermined gesture has been performed. In embodiments wherein both devices determine whether or not the predetermined gesture was performed, the first and/or second device may require that they agree.

In a subset of the second and third sets of embodiments (i.e., the embodiments in which the two devices are arranged to use a probe and response-based rather than a reflection-based determination of proximity), the first and second devices share timing information via a further communication channel In some such embodiments, the further communication channel is selected from the group comprising: ultrasonic communication; radio frequency communication; Wi-Fi®; Bluetooth®; and Bluetooth® Smart.

In some embodiments, the method further comprises the first device advertising a willingness to connect to the second device. In some potentially overlapping embodiments, the method further comprises the second device advertising a willingness to connect to the first device. In some such embodiments, said advertising is carried out over a separate communication channel. This separate communication channel may comprise, by way of non-limiting example only, Bluetooth® or Bluetooth® Smart.

Once the devices are determined to be proximate to one another, a secure communication link between them may be established to allow the devices to interact. The first and second devices may already have an association with each other. For example they may previously have been associated or paired with one another using Bluetooth®, WiFi or another such protocol. The notification provided in accordance with the invention thus far described may therefore be used to re-establish the connection by establishing a secure communication link quickly and conveniently.

However this is not essential. In another set of embodiments the notification may be used to facilitate, permit or initiate authenticating at least one of the first and second devices with respect to the other and thereby establishing a communication link—e.g., by Bluetooth® pairing.

The Applicant has appreciated that the principles outlined hereinabove are novel and inventive in their own right and thus when viewed from a second aspect, the present invention provides a method of establishing a communication link between a first device in presence of a second device which can interact with the first device, the method comprising:

using an ultrasonic signal transmitted by one of the devices to determine whether the first device is within a threshold distance of said second device;

if said first device is determined to be within said threshold distance of said second device, establishing said communication link.

In accordance with this aspect of the invention ultrasound is used to establish physical proximity between the devices and thus to establish a communication link between them. As mentioned above in respect of the first aspect of the invention, this gives a reasonable degree of security as it is hard to spoof such physical proximity In a first set of embodiments, the second aspect of the invention further comprises:

the second device transmitting an ultrasonic signal;

the second device receiving a reflected ultrasonic signal which is a reflection of the transmitted ultrasonic signal; and the second device determining from the reflected ultrasonic signal whether the first device is within said threshold distance; and the second device sending a message to the first device to establish said communication link if the first device is determined to be within said threshold distance.

In this set of embodiments, the second device (i.e., not the device on which the notification is triggered) transmits the ultrasonic signal and some time later receives a reflection of that same signal. The second device can then analyse the reflection and determine whether or not the first device is nearby, e.g., by measuring the combined time of flight of the transmitted signal and its reflection. The second device could be arranged to use a processing algorithm which discriminates between different reflectors but this is not essential and in general the ultrasonic signal could be reflected by anything having a suitably reflective surface which the signal encounters. This could be e.g., the first device itself or a user of the first device. The Applicant has appreciated that whilst this is a relatively basic arrangement which could be triggered by any object appearing at close range to the second device, it does have some advantages as set out below. Moreover, even if 'false positives' were to occur from time to time, there are no particularly adverse implications—a user will simply establish a communication link with a device which is typically on the same local area network that they are connected to anyway.

Advantageously, the potential simplicity of this arrangement makes development and implementation relatively low cost. In particular it requires implementation only by the second device. This is particularly advantageous in the typical situation where the second device is physically larger than the first (which is typically a portable device such as a smartphone) and mains powered as it is easier to add components and functionality to such larger devices than it is smartphones and there is also less need to consider battery life which is of critical importance in mobile devices.

Furthermore, as the second device performs the proximity determination, the security of the second device is improved as it is more difficult for an attacker to spoof their proximity to the second device when this is based on a physical phenomenon such as propagation of ultrasound signals. This is particularly advantageous in embodiments wherein the establishing the communication channel involves exchanging security or authentication credentials as will be described below.

The Applicant has appreciated that the present invention, at least when viewed from this second aspect, is particularly suited to establishing secure communication links between devices. In some embodiments, establishing the communication link comprises the first and second devices exchanging security credentials. This is particularly advantageous for pairing devices or connecting a device to a network for example. By only allowing security credentials such as personal identification number (PIN) codes, passwords or cryptographic keys to be exchanged after the proximity is determined using ultrasound, each device that has made such a determination can assume that the device with which it makes such an exchange is indeed proximate to it, which is typically an indication that the exchange is bonafide.

This establishment of a communication channel may include establishing a separate, potentially non-ultrasonic communication channel Accordingly, in some embodiments the communication channel link is selected from the group including: ultrasonic communication; radio frequency communication; Wi-Fi®; Bluetooth®; and Bluetooth® Smart.

In a second set of embodiments of the second aspect of the invention, the method further comprises:

the first device transmitting an ultrasonic probe signal;

the second device transmitting a ultrasonic response signal; and the first device receiving the ultrasonic response signal and determining therefrom whether the first device is within said threshold distance.

As outlined previously with regard to the first aspect of the invention, such embodiments advantageously allow for the second device to be relatively simple, since it only need respond to a probe rather than make any determination of proximity itself.

In a third set of embodiments of the second aspect of the invention, the method further comprises:

the second device transmitting an ultrasonic probe signal;
the first device transmitting a ultrasonic response signal;
the second device receiving the ultrasonic response signal and determining therefrom whether the first device is within said threshold distance; and
the second device sending a message to the first device to establish said communication link if the first device is determined to be within said threshold distance.

In this set of embodiments, as with the first set, it is the second device that initiates the proximity detection process but in this case is assisted by the first device. This arrangement provides the security benefits associated with having the first device initiate the proximity detection process but without requiring detailed analysis of a reflected signal to determine whether or not is arises from the first device (or a user thereof) to avoid 'false positives'.

In some embodiments, the method further comprises determining whether the user of the first device has performed a predetermined gesture before establishing the communication link. This advantageously reduces the likelihood of spurious detections and allows a user of the first device to positively confirm that that they do indeed wish to establish the communication channel between the first and second devices. For example, if the first device is a smartphone and the second device is an appliance, the user may physically perform a gesture with the smartphone in the presence of the appliance in order to confirm that they are indeed proximate to said appliance and wish to initiate communications between his or her device and the second device.

In some such embodiments, the communication link is established only if the second device determines from the reflected ultrasonic signal that the predetermined gesture has been performed. In embodiments wherein the second device uses reflections of a signal that it transmitted itself, the reflected signal may have certain properties that are indicative of the reflector moving in a particular way e.g., in a predetermined gesture such as moving the first device towards and then away from the second device.

Additionally or alternatively, in some embodiments the first device establishes said communication link only if it determines that the predetermined gesture has been performed. For example, the first device may comprise a motion sensor such as an accelerometer and/or a gyroscope which it uses to determine whether the predetermined gesture has been performed.

Using ultrasound to determine that two devices are proximate to one another in order to carry out a particular action is novel and inventive in its own right and thus when viewed from a third aspect, the present invention provides a method of operating a first device in the presence of a second device which can interact with the first device, the method comprising:

using an ultrasonic signal transmitted by one of the devices to determine whether the first device is within a threshold distance of said second device; and
if said first device is determined to be within said threshold distance of said second device, performing an action.

In some embodiments, the action comprises triggering a notification on the first device. In some embodiments, the method further comprises features as described hereinabove with reference to any of the foregoing embodiments of the invention when viewed from the first aspect.

In some embodiments, the action comprises establishing a communication link between the first and second devices. In some embodiments, the method further comprises features as described hereinabove with reference to any of the foregoing embodiments of the invention when viewed from the second aspect.

The Applicant has appreciated that because ultrasonic signals have a limited range and generally cannot penetrate walls, the mere reception of an appropriate ultrasonic signal can potentially be indicative of proximity When viewed from a fourth aspect, the present invention provides a method of operating a first device in the presence of a second device which can interact with the first device, the method comprising:

using an ultrasonic signal transmitted by one of the devices to determine that the devices should interact;
if it is determined that the devices should interact, performing an action to allow an interaction between the devices.

Additional properties of the ultrasonic signals may be used. In some embodiments, the method further comprises:

the first device transmitting an ultrasonic probe signal;
the second device receiving the ultrasonic probe signal;
the second device determining from the ultrasonic probe signal information relating to relative motion between the first and second devices; and
performing said action if the information corresponds to a predetermined relative motion between the first and second devices having taken place.

Thus it may be seen that properties of the ultrasonic probe signal can be used to determine whether a predetermined relative motion has taken place. In some such embodiments, the second device determines the relative motion from a Doppler shift of the ultrasonic probe signal. The Doppler effect imparts a change in frequency depending on a relative motion between the first and second devices. Such a Doppler shift may indicate to the second device that the first device has been moved in a motion towards and away from said second device. Such a towards and away gesture may be used to determine that the action should be performed i.e., a user wishes for the devices to interact.

The "information relating to relative motion" could comprise a determined change in relative spatial location between the first and second devices. Equally it could comprise other properties of the relative motion. For example, the information may comprise a relative velocity between the first and second devices. Such a relative velocity may be a linear movement between the devices e.g., caused by pushing one device closer to the other and then away again or may be an angular movement e.g., caused by rotating one device relative to the other. Other such properties of the relative motion of the two devices could be used in order to determine whether to perform the action to allow interaction between the devices.

In some embodiments the action is only performed if the first device also determines the predetermined relative motion has taken place. For example, the first device may comprise a motion sensor such as an accelerometer, magnetometer and/or a gyroscope which it uses to determine whether the predetermined relative motion has taken place. Alternatively, the first device itself may make a determination using the Doppler effect, e.g., on a further ultrasonic signal or, at least in appropriate embodiments, based on reflections of the ultrasonic probe signal that it transmitted itself.

The second device may comprise a motion sensor and thus in some potentially overlapping embodiments, the second device uses the received ultrasonic probe signal and an output from a motion sensor to determine whether the predetermined relative motion has taken place. Such a motion sensor may, by way of example only, comprise an accelerometer, a magnetometer and/or a gyroscope. The Applicant has appreciated that the use of a motion sensor to augment the received ultrasonic probe signal, means more robust determinations of the predetermined relative motion can be made.

In some embodiments, the action comprises triggering a notification on the first device. In some embodiments, the method further comprises features as described hereinabove with reference to any of the foregoing embodiments of the invention when viewed from the first aspect.

In some embodiments, the action comprises establishing a communication link between the first and second devices. In some embodiments, the method further comprises features as described hereinabove with reference to any of the foregoing embodiments of the invention when viewed from the second aspect.

In a set of embodiments of any of the foregoing aspects of the invention, the first device is a central device and the second device is a peripheral device.

In a set of embodiments of any of the foregoing aspects of the invention, the first device is a portable electronic device.

It will be appreciated that any technical features described with reference to any embodiments or sets of embodiments pertaining to any particular aspect of the invention may be readily applied to other aspects of the invention where appropriate and such combinations are deemed to fall within the scope of the claimed invention.

Certain embodiments of the present invention will now be described, by way of example only, with reference to the accompanying drawings in which:

FIG. 12 shows a flowchart illustrating the method of FIG. 11.

Figure 1:
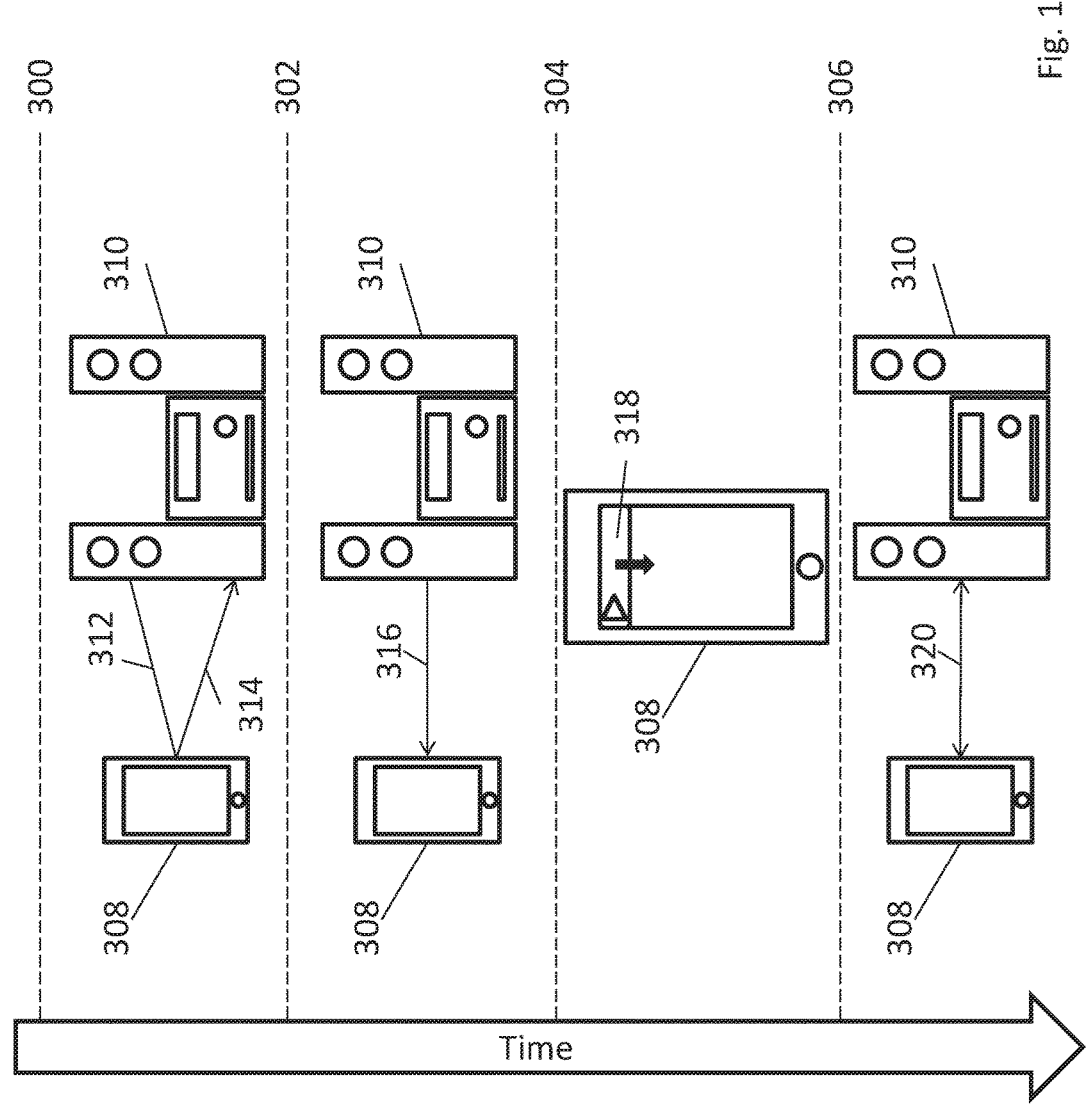
FIG. 1 shows a timing diagram of an echo-based ultrasonic proximity and notification method in accordance with an embodiment of the present invention.
Figure 2:
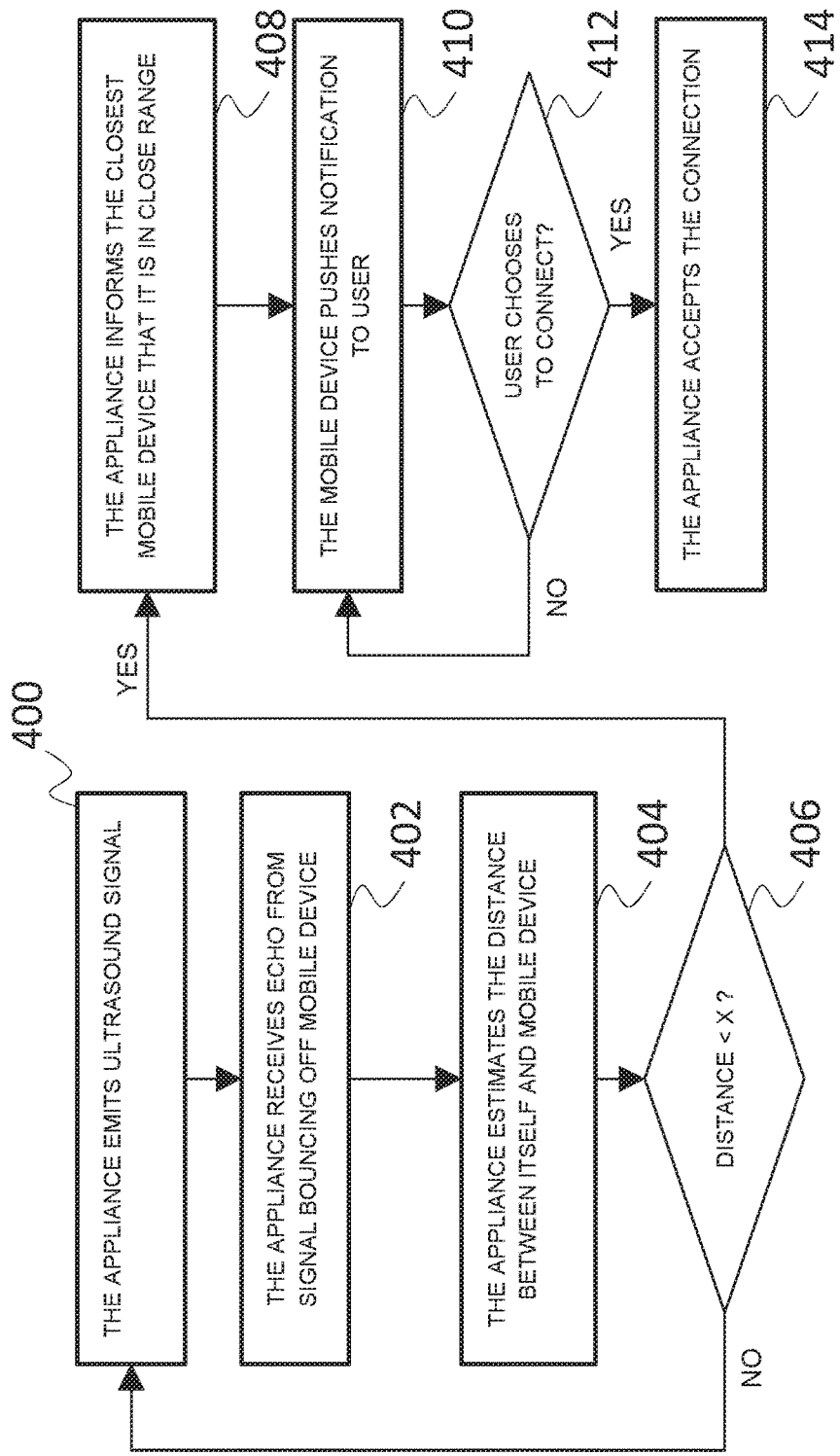
FIG. 2 shows a flowchart illustrating the method of FIG. 1.

FIG. 1 shows a timing diagram of an echo-based ultrasonic proximity and notification method in accordance with an embodiment of the present invention involving a first device 308 and a second device 310 and FIG. 2 shows a flowchart further illustrating the method of FIG. 1. In this exemplary embodiment, a Hi-Fi system 310 is available for connection to a smartphone 308—which may, for example, allow a user to stream multimedia content such as music from the smartphone 308 to the Hi-Fi system 310.

The smartphone 308 may have installed on it an application or "app" that allows the user to control the Hi-Fi system 310 remotely via the smartphone 308, e.g., by providing volume control, bass control, treble control etc. Alternatively, the smartphone 308 may not yet have the app installed, however the user of the smartphone 308 may be invited to download the appropriate app as a result of the process outlined below. In this example, the Hi-Fi system 310 is arranged to notify the user of the smartphone 308 that they are close enough to the Hi-Fi system to control it. This determination of proximity is carried out using ultrasound as will be described below.

At an initial time 300, the Hi-Fi system 310 emits an ultrasonic signal 312 (step 400). This ultrasonic signal is reflected by (i.e., it "bounces off") the smartphone 308 and the reflected signal 314 is received by the Hi-Fi system 310 (step 402). The Hi-Fi system 310 then calculates an estimate of the distance between itself and the smartphone 308 (step 404). This calculation may, for example, use the ultrasonic time-of-flight (TOF) or may use some other metric such as the amplitude or frequency spectrum associated with the reflected signal 314 it receives. It should be noted that the distance estimate may be relatively crude and the Hi-Fi system 310 requires only an estimate of the distance to the smartphone 308 rather than an exact measurement.

The Hi-Fi system 310 then compares the distance estimate to a threshold value (step 406). If the Hi-Fi system 310 determines that the smartphone 308 is too far away, it returns to the initial ultrasonic transmission state (step 400) and may repeat the process. However, if the Hi-Fi system 310 determines that the smartphone 308 is sufficiently close to the Hi-Fi system 310, the Hi-Fi 310 informs the smartphone 308 that it is the closest device to the Hi-Fi system 310 by sending it a notification signal 316 (step 408). This notification signal 316 may be a further ultrasonic signal or may be carried out using a separate communication channel such as Bluetooth®, assuming that the Hi-Fi 310 has previously paired with the smartphone 308 or via WiFi if it is on the same local area network (LAN).

The smartphone 308 receives this signal 316 and sends a notification to the operating system e.g., iOS®, Android™ or Windows Phone® running on the smartphone 308 (step 410). The operating system typically has a notification system coded within it for handling notifications. Based on the user preferences such as whether to allow notifications, whether to provide an audio alert, how to display a notification etc. (which may be set globally or on an application-specific basis), the operating system then provides a notification to the user. In this example, the notification is provided to the user in the form of a banner 318 (i.e., a rectangular graphical user interface element that appears at the top of the device's screen) that alerts the user that they can control the Hi-Fi system 310 using the appropriate app.

The user can then choose whether or not to connect to the Hi-Fi system 310 (step 412). By tapping on this banner 318 using the touchscreen of the smartphone 308, the smartphone 308 may open the appropriate app, allowing the user to initiate control of the Hi-Fi system 310 immediately once the Hi-Fi system 310 accepts the connection (step 414). If the user decides not to tap the notification, it may remain present on the graphical user interface for some predetermined amount of time or until dismissed by the user. If the user does not have the appropriate app installed, tapping on the notification may link the user to a location from which they can download the app, e.g., the App Store® on Apple® devices or the Windows® Store.

It will of course be appreciated that the subsequent connection to the device need not be fully automated. For example, the user may be presented with a list of Bluetooth® devices to which the smartphone 308 can be connected (e.g., because they have previously been paired with the smartphone 308), however those that are deemed to be closer as a result of the above-described process are "pushed" to the top of the list as these are the devices which the user most likely wishes to interact with.

Figure 3:
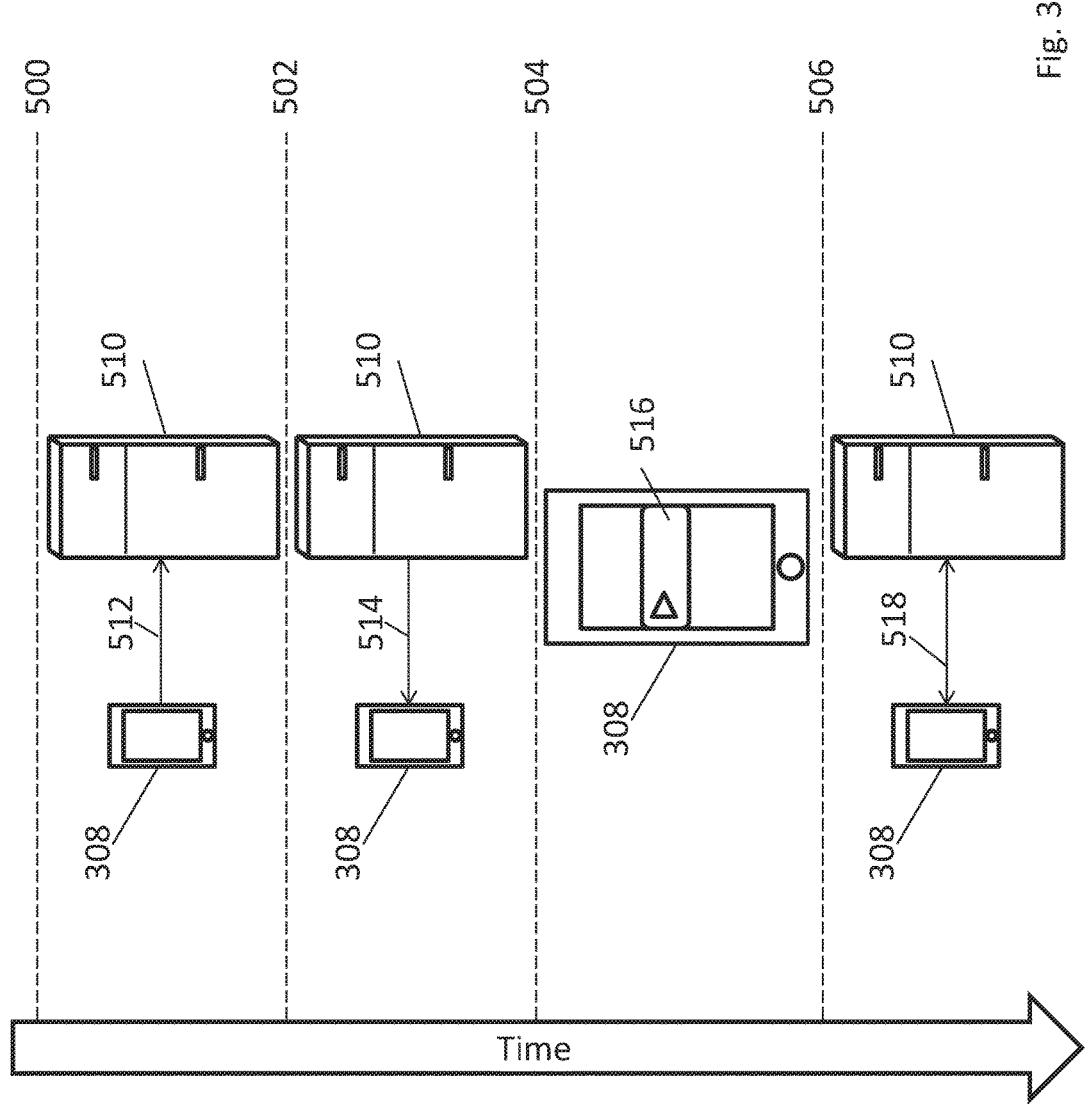
FIG. 3 shows a timing diagram of a probe-response-based ultrasonic proximity and notification method in accordance with an embodiment of the present invention.
Figure 4:
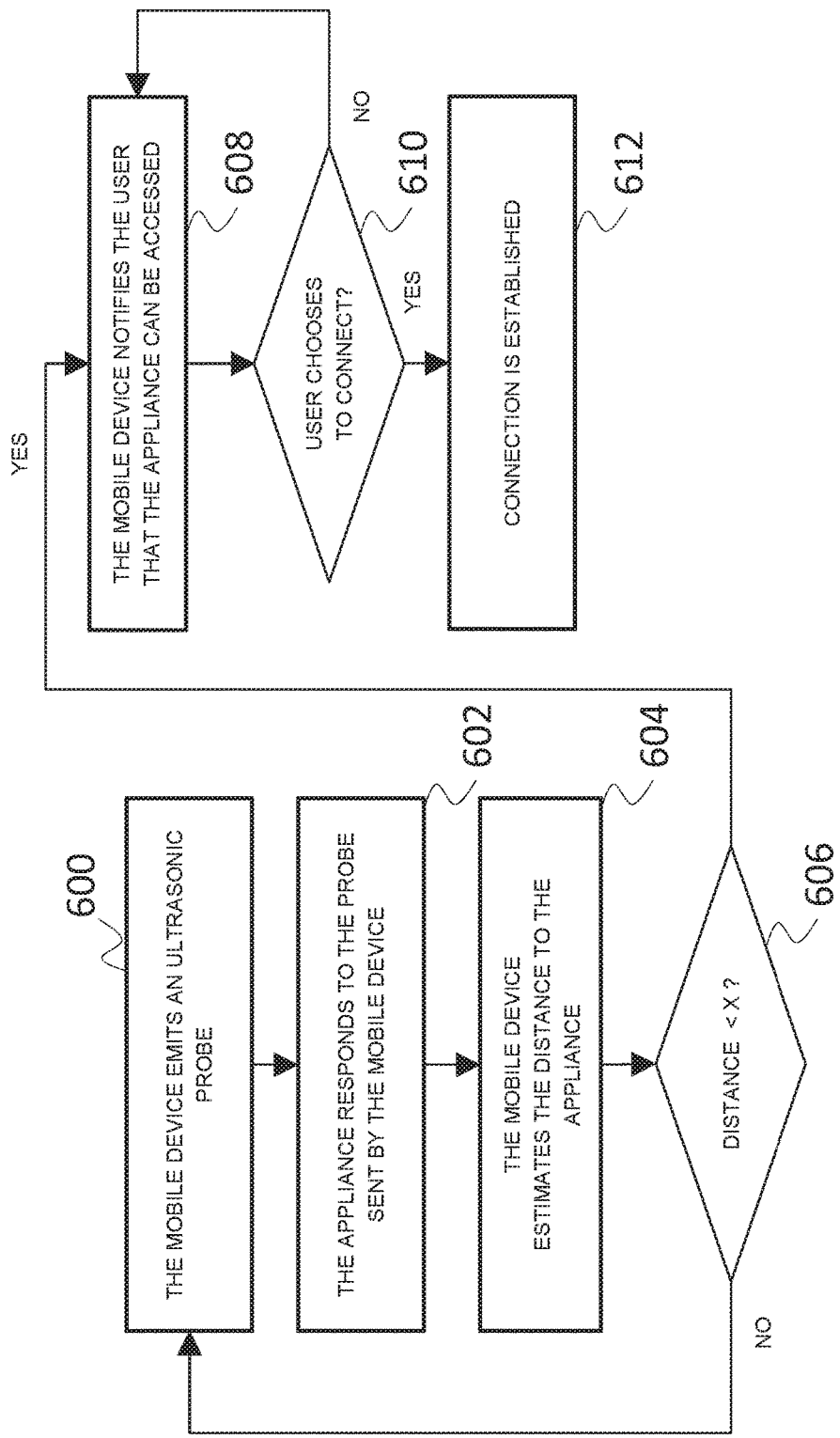
FIG. 4 shows a flowchart illustrating the method of FIG. 3.

FIG. 3 shows a timing diagram of a probe-response-based ultrasonic proximity and notification method in accordance with another embodiment of the present invention. FIG. 4 shows a flowchart further illustrating the method of FIG. 3. In this exemplary embodiment, a refrigerator 510 is available for connection to the smartphone 308—which may, for example, allow a user to send control commands from the smartphone 308 to the refrigerator 510 or for the refrigerator 510 to send updates to the smartphone, for example notifying a user that he or she is running low on milk as determined by a sensor within the refrigerator 510.

In this example, at an initial time 500 the smartphone 308 emits an ultrasonic probe signal 512 (step 600). This probe signal 512 may be sent out upon request of the user as a result of the user requesting a scan for IoT-capable appliances, or it may be sent intermittently e.g., periodically.

The refrigerator 510 may then receive this ultrasonic probe signal 512 and respond with an ultrasonic response signal 514 at a subsequent time 502 (step 602). The smartphone 308 can then calculate an estimate of its distance to the refrigerator 510 (step 604). This may be achieved, for example, by analysing the amplitude and/or frequency spectrum content of the response signal 514. Alternatively, the smartphone 308 may compare a transmission timestamp within the response signal 514 provided by the refrigerator 510 to the time at which the signal is received (assuming that the two devices are synchronised) and determine the distance from the propagation time of the response signal 514. Alternatively it could measure the time between transmission of the probe signal 512 and reception of the response signal 514, making an assumption as to the delay at the refrigerator 510 between receiving the probe 512 and transmitting the response 514. The delay could be predefined as part of a protocol. Alternatively, information regarding the delay could be conveyed using a back-channel (i.e., an alternative, separate communication channel between the smartphone 308 and the refrigerator 510).

The smartphone 308 then compares the distance estimate to a threshold value (step 606). If the smartphone 308 determines that the refrigerator 510 is too far away, it returns to the initial ultrasonic transmission state (step 600) and may repeat the process. However, if at a subsequent time 504 the smartphone 308 determines that the refrigerator 510 is sufficiently close to the smartphone 308, the smartphone 308 informs the user that the refrigerator 510 is available for connection (step 608). In this example, the notification generated by the operating system comprises a pop-up or "toast" notification 516 that appears in the centre of the touchscreen of the smartphone 308.

The user can then choose whether or not to connect to the refrigerator 510 by tapping or dismissing the notification 516 respectively (step 610). If the user chooses to connect to the refrigerator 510, a connection 518 can then be established between the devices 308, 510 using, by way of example only, Bluetooth®, Bluetooth® Smart, Wi-Fi® or some proprietary communication method using ultrasound (step 612). The refrigerator 510 may then provide data to the smartphone regarding its contents etc.

Figure 5:
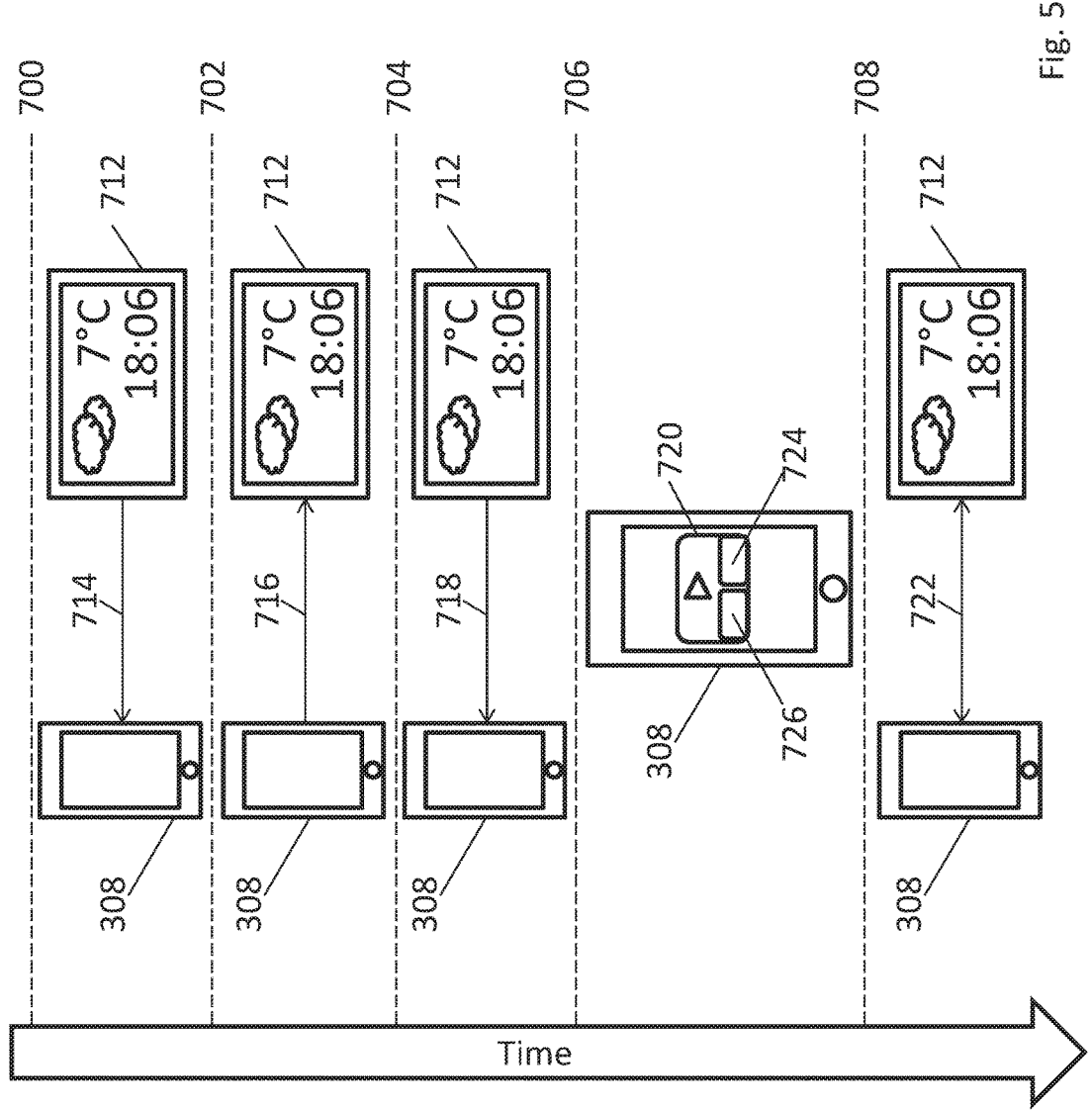
FIG. 5 shows a timing diagram of a further probe-response-based ultrasonic proximity and notification method in accordance with an embodiment of the present invention.
Figure 6:
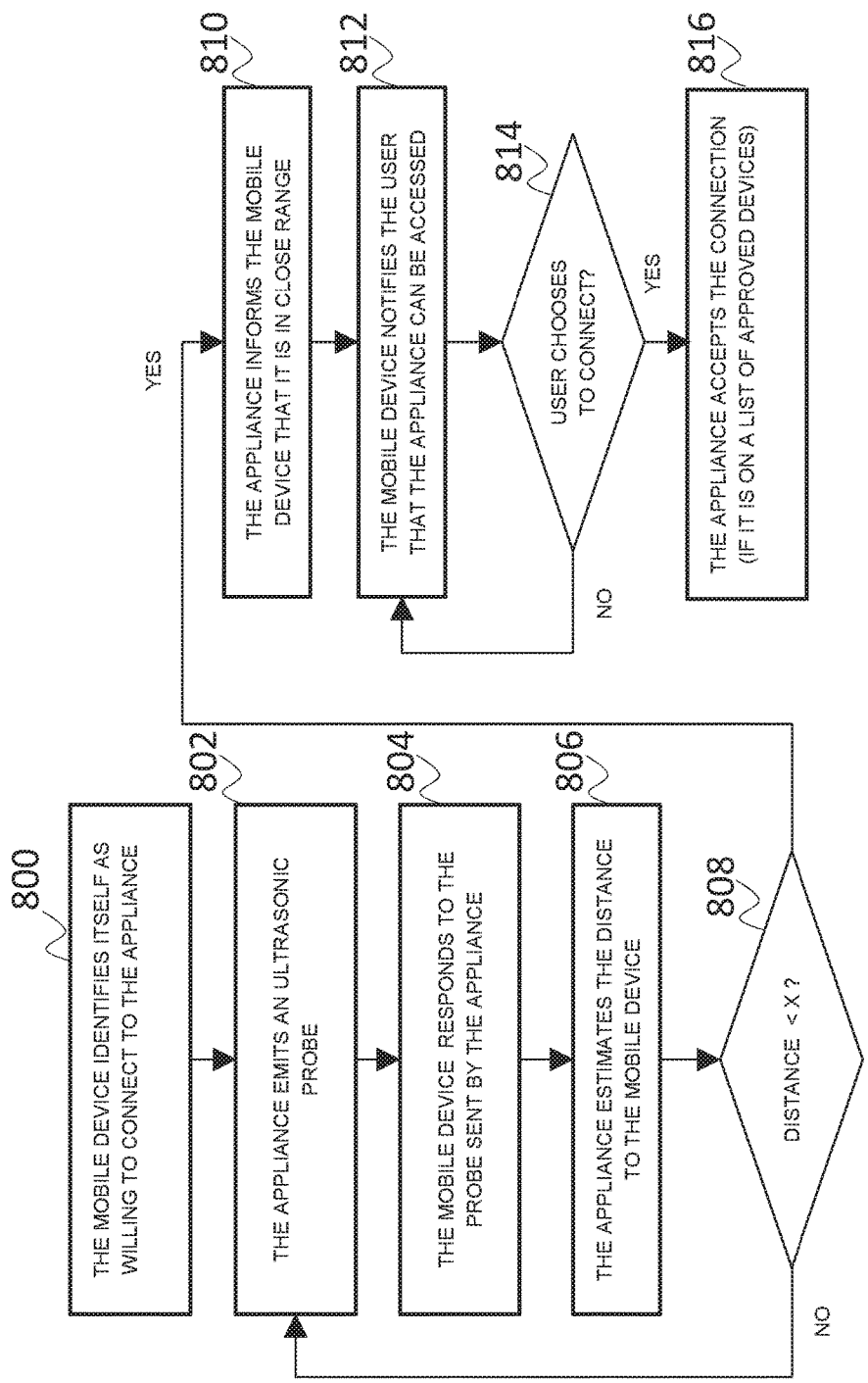
FIG. 6 shows a flowchart illustrating the method of FIG. 5.

FIG. 5 shows a timing diagram of a further probe-response-based ultrasonic proximity and notification method in accordance with a further embodiment of the present invention. FIG. 6 shows a flowchart further illustrating the method of FIG. 5. In this exemplary embodiment, a smart thermostat 712 is available for connection to a smartphone 308—which may, for example, allow a user to send control commands from the smartphone 308 to the thermostat 712—e.g., to turn the central heating on or off—or for the thermostat 712 to send updates to the smartphone, for example notifying a user of inclement weather conditions or of maintenance requirements.

In contrast to the method described previously with reference to FIGS. 3 and 4, here it is the thermostat 712 that emits the ultrasonic probe signal 714 at an initial time 700 (step 802). This probe signal 714 may be emitted periodically or may be emitted in response to the smartphone 308 identifying itself as being willing to connect to the thermostat 712 (step 800).

The smartphone 308 may then receive this ultrasonic probe signal 714 and respond 804 with an ultrasonic response signal 716 at a subsequent time 702. The thermostat 712 can then calculate an estimate of its distance to the smartphone 308 (step 806). This may be achieved, for example, by analysing the amplitude and/or frequency spectrum content of the response signal 716. Alternatively, the thermostat 712 may compare a transmission timestamp within the response signal 716 provided by the smartphone 308 to the time at which the signal is received (assuming that the devices are synchronised) and determine the distance from the propagation time of the response signal 716. Alternatively it could measure the time between transmission of the probe signal 714 and reception of the response signal 716, making an assumption as to the delay at the smartphone between receiving the probe 714 and transmitting the response 716.

The thermostat 712 then compares the distance estimate to a threshold value (step 808). If the thermostat 712 determines that the smartphone 308 is too far away, it returns to the initial ultrasonic transmission state (step 802) and may repeat the process. However, if at a subsequent time 704 the thermostat 712 determines that the smartphone 308 is sufficiently close to the thermostat 712, the thermostat 712 informs 608 informs the smartphone 308 that it is in close range to the thermostat 712 by sending it a notification signal 718 (step 810). This notification signal 718 may be a further ultrasonic signal or may be carried out using a separate communication channel such as Bluetooth®.

As before, the smartphone 308 receives this signal 718 and sends a notification to the operating system running on the smartphone 308. The operating system then notify the user that the thermostat 712 is in range of the smartphone 308 and available for connection and/or control (step 812). In this example, the notification is provided to the user in the form of an alert 720 that appears in the centre of the touchscreen of the smartphone 308.

The user can then choose whether or not to connect to the thermostat 712 (step 814). By tapping on an accept button 724 on the alert 720 using the touchscreen of the smartphone 308, the smartphone 308 may subsequently open the appropriate app, allowing the user to initiate control of the thermostat 712 immediately once the thermostat 712 accepts the connection (816). If the user taps a cancel button 726 or chooses to ignore the alert 720, it may remain present on the graphical user interface for some predetermined amount of time or until dismissed by the user.

Figure 7:
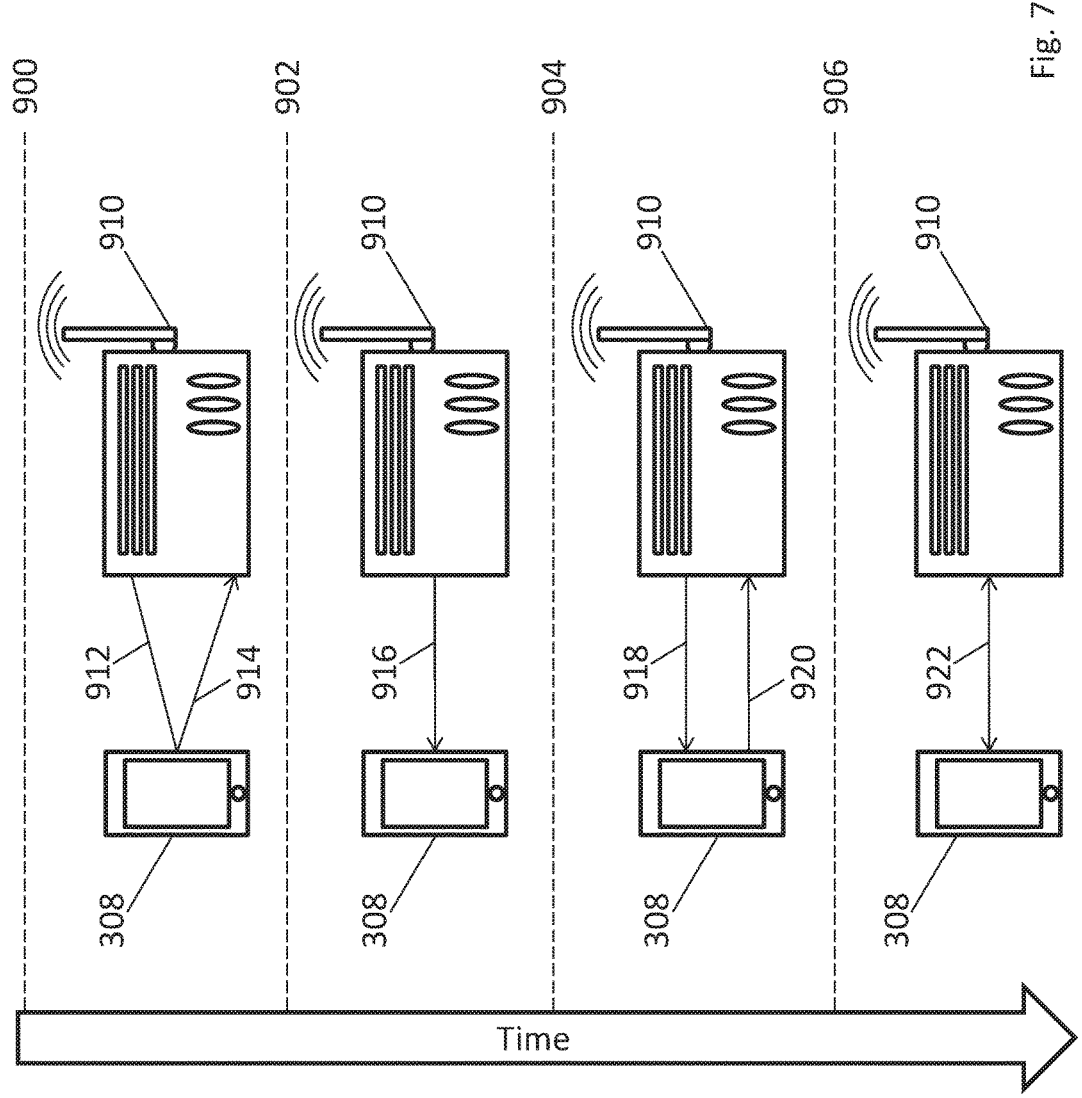
FIG. 7 shows a timing diagram of an echo-based ultrasonic proximity and authentication method in accordance with an embodiment of the present invention.
Figure 8:
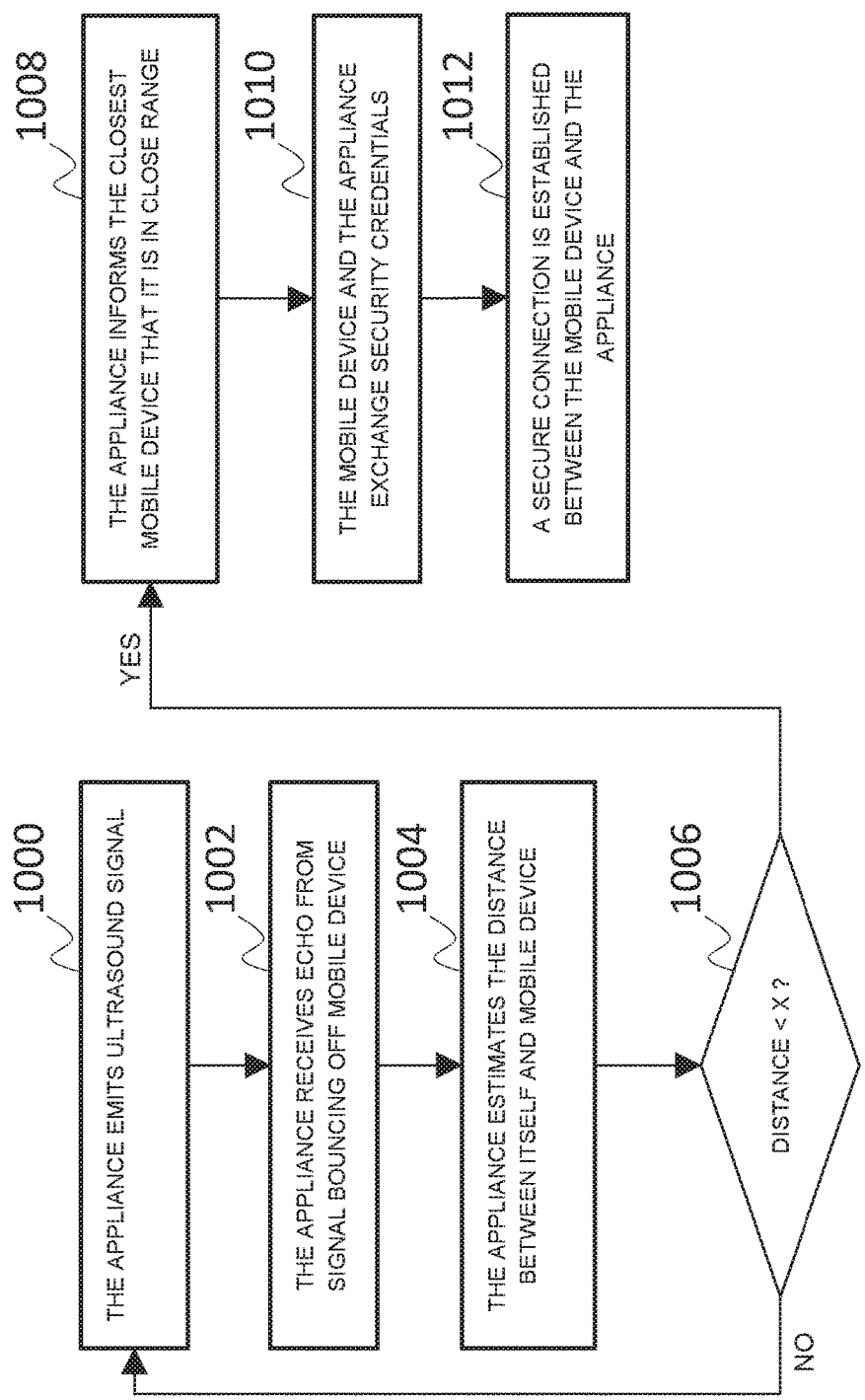
FIG. 8 shows a flowchart illustrating the method of FIG. 7.

FIG. 7 shows a timing diagram of an echo-based ultrasonic proximity and authentication method in accordance with a further embodiment of the present invention. FIG. 8 shows a flowchart further illustrating the method of FIG. 7. In this embodiment, a wireless router 910 (e.g., an IEEE 802.11 compliant Wi-Fi® router) is available for connection to the smartphone 308 so as to provide the smartphone 308 with network functionality and access to the Internet.

Wireless routers typically employ some form of wireless security scheme such as Wi-Fi® Protected Access (WPA) in order to prevent unauthorised network access by requiring any devices connecting to the router to provide a predetermined network key. However, managing and storing these network keys can be cumbersome, frustrating and unintuitive for the average user. One approach that is prevalent across newer router models is to provide a push button that initiates the Wi-Fi® Protected Setup (WPS)—previously known as Wi-Fi® Simple Config—scheme that enables a connection between a WPS compatible device and the router. By requiring physical access to the router, it is much more difficult for an attacker to gain unauthorised access to the network. However, this approach can still prove cumbersome for users who may find it difficult to physically access the router in order to press the WPS button. The embodiment of the invention described here with reference to FIGS. 7 and 8 seeks to address this issue using ultrasound.

At an initial time 900, the router 910 emits an ultrasonic signal 912 (step 1000). This ultrasonic signal is reflected by (i.e., it "bounces off") the smartphone 308 and the reflected signal 914 is received by the router 910 (step 1002). The router 910 then calculates an estimate of the distance between itself and the smartphone 308 (step 1004). This calculation may, for example, use the ultrasonic time-of-flight (TOF) or may use some other metric such as the amplitude or frequency spectrum associated with the reflected signal 914 it receives. It should be noted that the distance estimate may be relatively crude and the router 910 requires only an estimate of the distance to the smartphone 308 rather than an exact measurement. Indeed, the router 910 may simply require that it receives any echo at all corresponding to a reflection by the smartphone 308 as such a reflection would sufficiently prove that the smartphone 308 is proximate to the router 910.

The router 910 then compares the distance estimate to a threshold value (step 1006). If the router 910 determines that the smartphone 308 is too far away, it returns to the initial ultrasonic transmission state (step 1000) and may repeat the process. However, if the router 910 determines that the smartphone 308 is sufficiently close to the router 910, the router 910 informs the smartphone 308 that it is the closest device to the router 910 by sending it an acknowledgement signal 916 at time 902 (step 1008). This acknowledgement signal 916 may be a further ultrasonic signal or may be carried out using a separate communication channel The smartphone 308 receives this signal 916 and subsequently the smartphone 809 and the router 910 exchange security credentials 918, 920 such as security certificates, keys, passwords etc. at time 904 (step 1010)—e.g., in accordance with the IEEE 802.11 protocol. This then permits the establishment of a secure connection 922 between the smartphone 308 and the router 910 at time 906 (step 1012).

Figure 9:
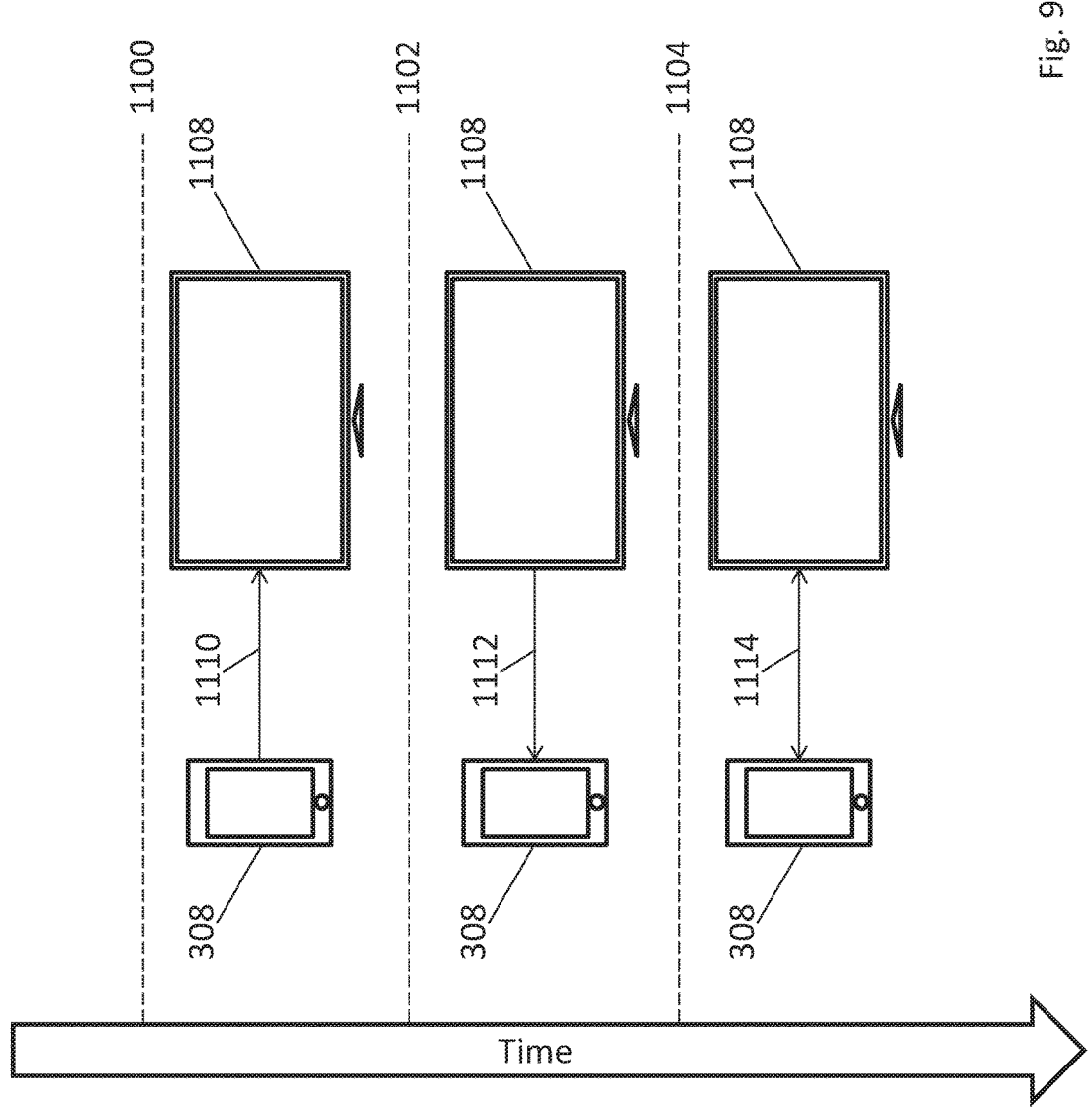
FIG. 9 shows a timing diagram of a probe-response-based ultrasonic proximity and authentication method in accordance with an embodiment of the present invention.
Figure 10:
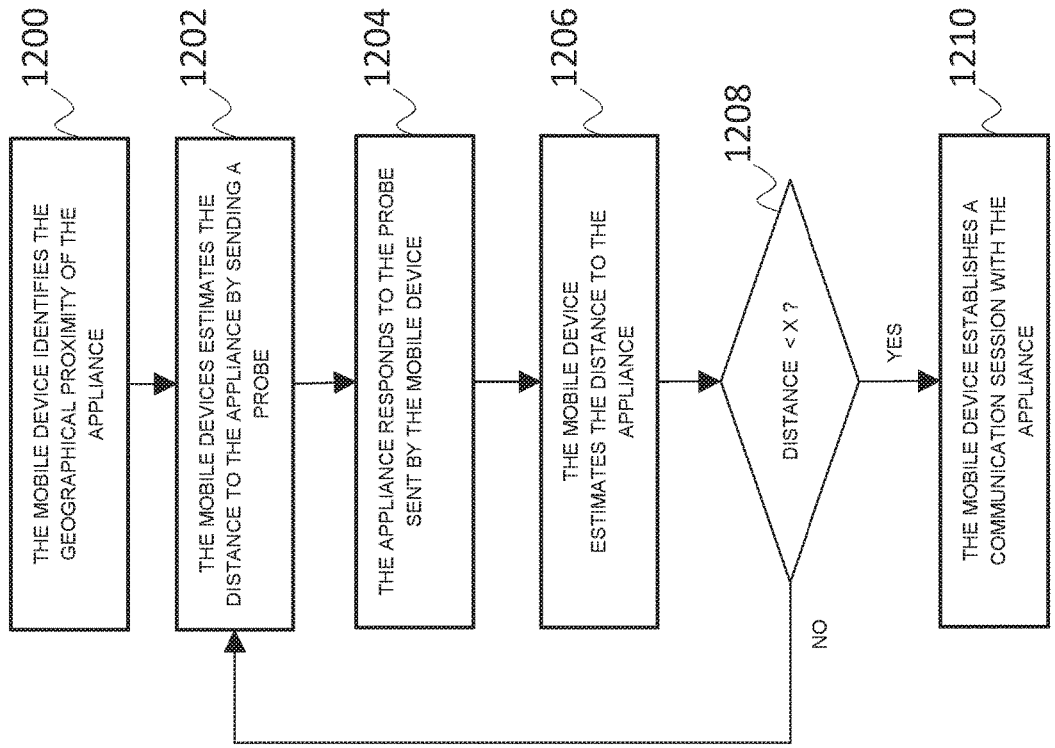
FIG. 10 shows a flowchart illustrating the method of FIG. 9.

FIG. 9 shows a timing diagram of a probe-response-based ultrasonic proximity and authentication method in accordance with an embodiment of the present invention. FIG. 10 shows a flowchart further illustrating the method of FIG. 9. In this embodiment, a television 1108 is available for connection to the smartphone 308—which may, for example, allow a user to send control commands from the smartphone 308 to the television 1108 e.g., to change channel, volume etc. or to stream content directly from the smartphone 308 to the television 1108.

In this example, at an initial time 1100, once the smartphone 308 has determined 1200 that the television 1108 is geographically proximate (e.g., it may be visible on a list of Bluetooth® devices nearby or connected to the same local area network), it emits an ultrasonic probe signal 1110 (step 1202). This probe signal 1110 may be sent out upon request of the user as a result of the user requesting a scan for IoT-capable appliances, or it may be sent intermittently e.g., periodically.

The television 1108 may then receive this ultrasonic probe signal 1110 and respond with an ultrasonic response signal 1112 at a subsequent time 1102 (step 1204). The smartphone 308 can then calculate 1206 an estimate of its distance to the television 1108. This may be achieved, for example, by analysing the amplitude and/or frequency spectrum content of the response signal 1112. Alternatively, the smartphone 308 may compare a transmission timestamp within the response signal 1112 provided by the television 1108 to the time at which the signal is received and determine the distance from the propagation time of the response signal 1112.

The smartphone 308 then compares the distance estimate to a threshold value (step 1208). If the smartphone 308 determines that the television 1108 is too far away, it returns to the initial ultrasonic transmission state (step 1202) and may repeat the process. However, if at a subsequent time 1104 the smartphone 308 determines that the television 1108 is sufficiently close to the smartphone 308, the smartphone 308 establishes a communication session with the television 1108 e.g., over a local Wi-Fi® network or using Bluetooth® or Bluetooth® Smart (step 1210). This advantageously prevents the smartphone 308 from inadvertently connecting to an unintended device e.g., a neighbour's television rather than their own.

Figure 11:
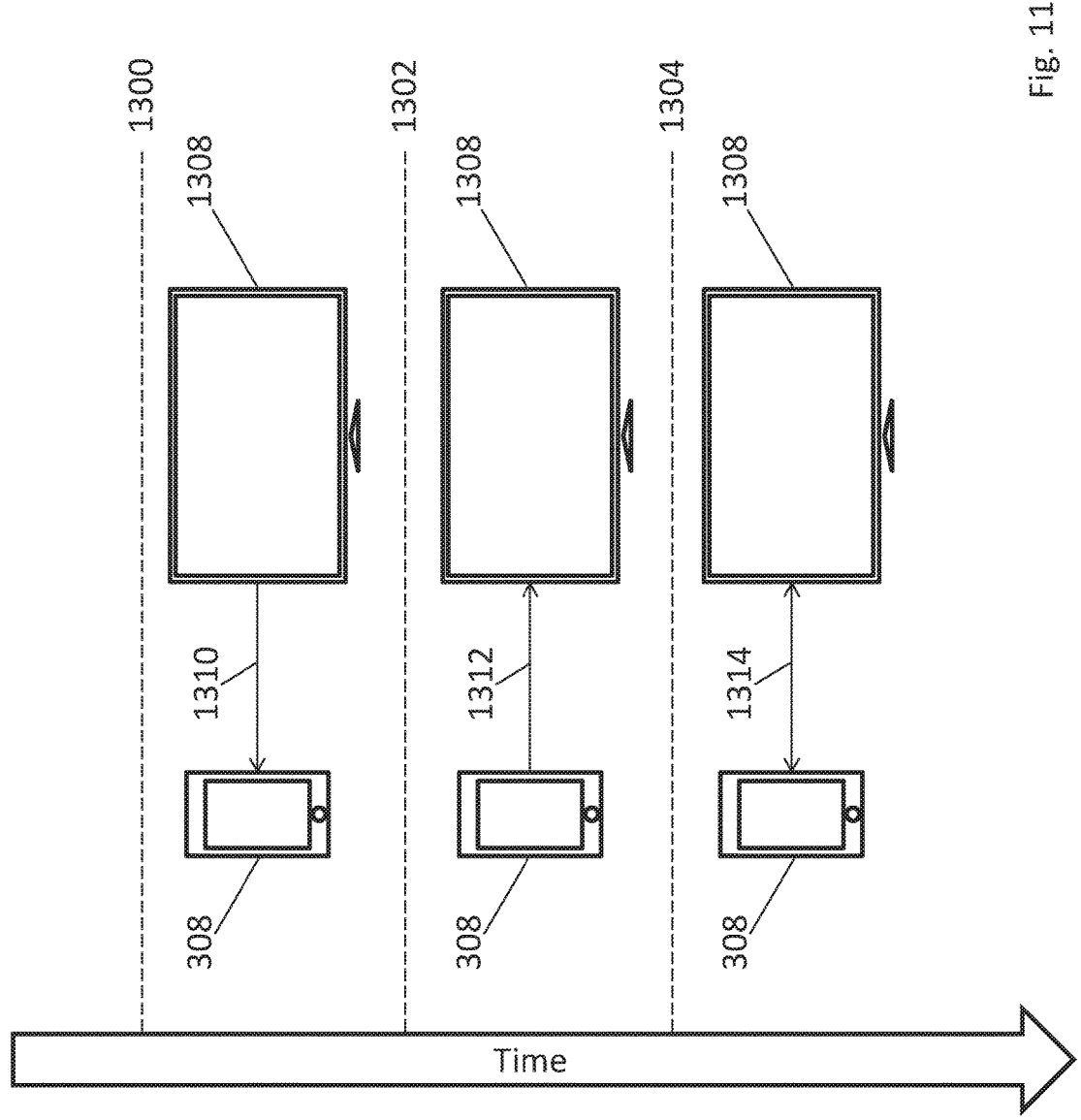
FIG. 11 shows a timing diagram of a further probe-response-based ultrasonic proximity and authentication method in accordance with an embodiment of the present invention.

FIG. 11 shows a timing diagram of a further probe-response-based ultrasonic proximity and authentication method in accordance with an embodiment of the present invention. FIG. 12 shows a flowchart further illustrating the method of FIG. 11. Similarly to the example outlined above with reference to FIGS. 9 and 10, in this embodiment a television 1308 is again available for connection to the smartphone 308. However, in this example, it is the television 1308 that determines the proximity rather than the smartphone.

At an initial time 1300, the television 1308 emits an ultrasonic probe signal 1310 (step 1402). This probe signal 1310 may be emitted out upon request of the user as a result of the user requesting a scan for IoT-capable mobile devices (e.g., the user may press a button on a dedicated remote control of the TV that puts it into a pairing mode wherein the probe signal 1310 is emitted), or it may be emitted in response to the smartphone 308 identifying itself as being willing to connect to the television 1308 (step 1400).

The smartphone 308 may then receive this ultrasonic probe signal 1310 and respond with an ultrasonic response signal 1312 at a subsequent time 1302 (step 1404). The television 1308 can then calculate an estimate of its distance to the smartphone 308 (step 1406). This may be achieved, for example, by analysing the amplitude and/or frequency spectrum content of the response signal 1312. Alternatively, the television 1308 may compare a transmission and reception timestamps and determine the distance from the propagation time of the response signal 1312.

The television 1308 then compares the distance estimate to a threshold value (step 1408). If the television 1308 determines that the smartphone 308 is too far away, it returns to the initial ultrasonic transmission state (step 1402) and may repeat the process. However, if at a subsequent time 1304 the television 1308 determines that the smartphone 308 is sufficiently close, the smartphone 308 and the television 1308 may establish a connection 1314 between them as described previously (step 1412). In this particular example, the connection 1314 is achieved by the smartphone 308 and the television 1308 exchanging security credentials such as a secret key that is then used for future communications between the two devices, allowing them to communicate without requiring this pairing procedure each time (step 1410).

Thus it will be seen that a method of providing notifications and establishing communication channels between electronic devices using ultrasound to determine that they are suitable proximate to one another has been described herein. Although particular embodiments have been described in detail, it will be appreciated by those skilled in the art that many variations and modifications are possible using the principles of the invention set out herein.

The invention claimed is:

1. A method of alerting a user of a first device to presence of a second device which can interact with the first device, the method comprising:
the first device transmitting an ultrasonic probe signal;
the second device transmitting an ultrasonic response signal;
the first device receiving the ultrasonic response signal and determining therefrom whether the first device is within a threshold distance of said second device; and
if said first device is determined to be within said threshold distance of said second device, triggering a notification on the first device.

2. The method of claim 1, wherein the notification comprises an operating system-level notification.

3. The method of claim 1, wherein the notification provides a shortcut to an associated application installed on the first device such that interacting with the notification, causes the first device to open the associated application automatically.

4. The method of claim 3, wherein the application is a control application arranged to control the second device.

5. The method of claim 3, wherein the notification provides a link to the user of the first device to download the application if said application is not installed on the first device.

6. The method of claim 1, further comprising the first and second devices sharing timing information via a further communication channel.

7. The method of claim 1, further comprising determining whether the user of the first device has performed a predetermined gesture before triggering the notification.

8. The method of claim 7, wherein the first device triggers said notification only if it determines that the predetermined gesture has been performed.

9. The method of claim 1, further comprising at least one of the first device and the second device advertising a willingness to connect to another of the first device and the second device.

10. The method of claim 9, comprising carrying out said advertising over a separate communication channel.

11. The method of claim 1, comprising using the notification to facilitate, permit or initiate authenticating at least one of the first and second devices with respect to the other and thereby establishing a communication link therebetween.

12. A method of establishing a communication link between a first device in presence of a second device which can interact with the first device, the method comprising:
the first device transmitting an ultrasonic probe signal;
the second device transmitting an ultrasonic response signal;
the first device receiving the ultrasonic response signal and determining therefrom whether the first device is within a threshold distance of said second device; and
if said first device is determined to be within said threshold distance of said second device, establishing said communication link.

13. The method of claim 12, wherein establishing the communication link comprises the first and second devices exchanging security credentials.

14. The method of claim 12, further comprising determining whether the user of the first device has performed a predetermined gesture before establishing the communication link.

15. The method of claim 14, comprising establishing the communication link only if the second device determines from a reflected ultrasonic signal that the predetermined gesture has been performed.

16. The method of claim 14, wherein the first device establishes said communication link only if it determines that the predetermined gesture has been performed.

17. A method of operating a first device in the presence of a second device which can interact with the first device, the method comprising:
the first device transmitting an ultrasonic probe signal;
the second device transmitting an ultrasonic response signal;
the first device receiving the ultrasonic response signal and determining therefrom whether the first device is within a threshold distance of said second device; and
if said first device is determined to be within said threshold distance of said second device, performing an action.

18. The method of claim 17, wherein the action comprises triggering a notification on the first device.

19. The method of claim 17, wherein the action comprises establishing a communication link between the first and second devices.

20. A method of operating a first device in the presence of a second device which can interact with the first device, the method comprising:
the first device transmitting an ultrasonic probe signal;
the second device transmitting an ultrasonic response signal;
the first device receiving the ultrasonic response signal and determining therefrom that the devices should interact; and if it is determined that the devices should interact, performing an action to allow an interaction between the devices.

21. The method of claim 20, further comprising:
the second device determining from the ultrasonic probe signal information relating to relative motion between the first and second devices; and
performing said action if the information corresponds to a predetermined relative motion between the first and second devices having taken place.

22. The method of claim 21, comprising the second device determining the relative motion from a Doppler shift of the ultrasonic probe signal.

23. The method of claim 21, comprising performing the action only if the first device also determines the predetermined relative motion has taken place.

24. The method of claim 21, further comprising the second device using the received ultrasonic probe signal and an output from a motion sensor to determine whether the predetermined relative motion has taken place.

25. The method of claim 20, further comprising the first and second devices sharing timing information via a further communication channel.

26. A method of alerting a user of a first device to presence of a second device which can interact with the first device, the method comprising:
the second device transmitting an ultrasonic probe signal;
the first device transmitting a ultrasonic response signal;
the second device receiving the ultrasonic response signal and determining therefrom whether the first device is within a threshold distance of said second device; and
the second device sending a message to the first device to trigger a notification on the first device if said first device is determined to be within said threshold distance of said second device.

27. A method of establishing a communication link between a first device in presence of a second device which can interact with the first device, the method comprising:
the second device transmitting an ultrasonic probe signal;
the first device transmitting an ultrasonic response signal;
the second device receiving the ultrasonic response signal and determining therefrom whether the first device is within a threshold distance of said second device; and
the second device sending a message to the first device to establish said communication link if the first device is determined to be within said threshold distance.

28. A method of operating a first device in the presence of a second device which can interact with the first device, the method comprising:
the second device transmitting an ultrasonic probe signal;
the first device transmitting an ultrasonic response signal;
the second device receiving the ultrasonic response signal and determining therefrom whether the first device is within a threshold distance of said second device; and
the second device sending a message to the first device to trigger the first device to perform an action if said first device is determined to be within said threshold distance of said second device.

29. A method of operating a first device in the presence of a second device which can interact with the first device, the method comprising:
the second device transmitting an ultrasonic probe signal;
the first device transmitting an ultrasonic response signal;
the second device receiving the ultrasonic response signal and determining therefrom that the devices should interact; and
the second device sending a message to the first device to trigger the first device to perform an action to allow an interaction between the devices if it is determined that the devices should interact.

* * * * *